(12) United States Patent
Dumusois et al.

(10) Patent No.: US 9,540,527 B2
(45) Date of Patent: Jan. 10, 2017

(54) INK COATINGS FOR SECURITY DOCUMENTS TO PREVENT FORGERY BY MEANS OF HEAT SENSITIVE ERASABLE INK

(75) Inventors: Christophe Dumusois, Lausanne (CH); Cécile Leprince, Yverdon-les-Bains (CH); Dagmar Lukas, Lausanne (CH)

(73) Assignee: SICPA HOLDING SA, Prilly (CH)

( * ) Notice: Subject to any disclaimer, the term of this patent is extended or adjusted under 35 U.S.C. 154(b) by 330 days.

(21) Appl. No.: 14/351,042

(22) PCT Filed: Sep. 11, 2012

(86) PCT No.: PCT/EP2012/067682
§ 371 (c)(1),
(2), (4) Date: Jun. 13, 2014

(87) PCT Pub. No.: WO2013/053556
PCT Pub. Date: Apr. 18, 2013

(65) Prior Publication Data
US 2015/0054274 A1 Feb. 26, 2015

Related U.S. Application Data

(60) Provisional application No. 61/545,798, filed on Oct. 11, 2011.

(30) Foreign Application Priority Data

Oct. 11, 2011 (EP) ..................................... 11184571

(51) Int. Cl.
| | | |
|---|---|---|
| C09D 11/50 | (2014.01) |
| C09D 11/02 | (2014.01) |
| C09D 11/03 | (2014.01) |
| B41M 3/14 | (2006.01) |
| B42D 25/30 | (2014.01) |
| D21H 21/40 | (2006.01) |
| B42D 25/29 | (2014.01) |
| B42D 25/318 | (2014.01) |

(52) U.S. Cl.
CPC ............... *C09D 11/03* (2013.01); *B41M 3/14* (2013.01); *B42D 25/29* (2014.10); *B42D 25/30* (2014.10); *C09D 11/02* (2013.01); *C09D 11/50* (2013.01); *D21H 21/40* (2013.01); *B42D 25/318* (2014.10); *B42D 2035/08* (2013.01)

(58) Field of Classification Search
CPC ......... C09D 11/02; C09D 11/03; C09D 11/50; B41M 3/14; B42D 25/30; D21H 21/40
USPC ............... 106/31.32, 31.23; 283/74; 101/483
See application file for complete search history.

(56) References Cited

U.S. PATENT DOCUMENTS

| | | | |
|---|---|---|---|
| 4,198,445 A * | 4/1980 | Sokol .................... | C09D 11/50 427/140 |
| 4,720,301 A | 1/1988 | Kito et al. | |
| 4,769,072 A * | 9/1988 | Bondurant .............. | B41N 3/08 106/31.32 |
| 4,884,828 A | 12/1989 | Burnham et al. | |
| 4,889,559 A * | 12/1989 | Goldberg ............... | C09D 11/50 106/31.24 |
| 5,232,494 A | 8/1993 | Miller | |
| 5,296,275 A | 3/1994 | Goman et al. | |
| 5,326,388 A | 7/1994 | Miller et al. | |
| 5,486,228 A | 1/1996 | Miller et al. | |
| 5,498,282 A * | 3/1996 | Miller .................... | C09D 11/50 106/31.28 |
| 5,510,199 A | 4/1996 | Martin | |
| 5,601,683 A | 2/1997 | Martin | |
| 5,702,511 A * | 12/1997 | de Saint-Romain ... | C09D 11/50 106/31.32 |
| 5,759,246 A * | 6/1998 | Frey ...................... | C09D 11/16 106/31.32 |
| 5,900,094 A * | 5/1999 | Santini .................. | C09D 11/16 156/230 |
| 6,306,929 B1 * | 10/2001 | Amon ..................... | B41M 3/14 522/100 |
| 6,800,124 B2 * | 10/2004 | Puntambekar ............ | A61L 2/28 106/31.32 |
| 7,083,665 B1 * | 8/2006 | Davies-Smith ....... | C09D 11/037 106/31.32 |
| 7,365,107 B2 * | 4/2008 | Denninger ............. | C09D 11/50 106/31.32 |
| 7,494,537 B2 | 2/2009 | Ono et al. | |
| 7,699,917 B1 * | 4/2010 | Pagnotta ................ | C09D 11/50 106/31.03 |
| 2003/0045608 A1 * | 3/2003 | Ochiai ................... | C09D 11/03 523/160 |
| 2007/0017413 A1 | 1/2007 | Kwan et al. | |
| 2007/0189836 A1 * | 8/2007 | Senga .................... | C09D 11/50 401/195 |

FOREIGN PATENT DOCUMENTS

| | | |
|---|---|---|
| CN | 1246883 | 3/2000 |
| CN | 1890333 | 1/2007 |

(Continued)

OTHER PUBLICATIONS

English translation of JP 2007/204573; Aug. 2007; 7 pages.*

(Continued)

*Primary Examiner* — Helene Klemanski
(74) *Attorney, Agent, or Firm* — Greenblum & Bernstein, P.L.C.

(57) ABSTRACT

Disclosed is a solvent-borne or UV-curable fugitive ink composition for application to a substrate that is to be provided with indicia. The ink composition comprises at least one halochromic compound and at least one filler compound and is capable of preventing indicia formed with a heat sensitive erasable ink on an area of the substrate carrying the fugitive ink composition and thereafter subjected to a thermal treatment from becoming invisible to an unaided eye.

20 Claims, 4 Drawing Sheets

(56) References Cited

U.S. PATENT DOCUMENTS

| | | |
|---|---|---|
| 2009/0036304 A1 | 2/2009 | Misner et al. |
| 2009/0050013 A1 | 2/2009 | Fujita |
| 2009/0215620 A1 | 8/2009 | Cella et al. |
| 2010/0120614 A1 | 5/2010 | Ono |
| 2010/0234504 A1* | 9/2010 | Fyvie .................. C09D 11/50 524/260 |
| 2011/0008095 A1 | 1/2011 | Fujita |
| 2012/0093736 A1* | 4/2012 | Jelonek ................ C09D 11/50 424/10.3 |
| 2012/0196058 A1* | 8/2012 | Kleinert .............. C25D 11/243 428/34.1 |

FOREIGN PATENT DOCUMENTS

| | | |
|---|---|---|
| CN | 101412866 | 4/2009 |
| EP | 0 279 526 | 8/1988 |
| EP | 0 704 505 | 4/1996 |
| EP | 0 835 292 | 4/1998 |
| EP | 1 820 662 | 8/2007 |
| EP | 2 072 277 | 6/2009 |
| EP | 2 138 550 | 12/2009 |
| JP | 61-002964 | 1/1986 |
| JP | 2007-204573 | 8/2007 |
| JP | 2010-229333 | 10/2010 |
| JP | 2010-241867 | 10/2010 |
| WO | 97/41181 | 11/1997 |
| WO | 98/36032 | 8/1998 |
| WO | 2005/035673 | 4/2005 |
| WO | 2009/017876 | 2/2009 |
| WO | 2011/038829 | 4/2011 |

OTHER PUBLICATIONS

International Search Report in respect to International Application No. PCT/EP2012/067682, dated Oct. 31, 2012.
Australian Examination Report in respect to Australian Application No. 2012323198, dated Aug. 28, 2015.
Chinese Office Action with English Translation in respect to Chinese Application No. 201280049962.5, mailed Mar. 19, 2015.
Russian Office Action in Russian Patent Application No. 2014118680/05(029477) dated Jul. 22, 2016 (and English language translation).
Japanese Office Action with English Translation in respect to Japanese Application No. P2014-534981, dated Apr. 19, 2016.

* cited by examiner

INK COATINGS FOR SECURITY DOCUMENTS TO PREVENT FORGERY BY MEANS OF HEAT SENSITIVE ERASABLE INK

CROSS-REFERENCE TO RELATED APPLICATIONS

This application is a national stage of PCT/EP2012/067682, filed Sep. 11,2012, which claims the benefit of Provisional Application No. 61/545,798, filed Oct. 11,2011, and European Patent Application No. EP 11184571.5.

BACKGROUND OF THE INVENTION

1. Field of the Invention

The present invention relates generally to the field of the protection of value documents against forgery. Particularly the invention relates to the protection of value documents against forgery involving heat sensitive erasable ink compositions and the use of pens comprising a refill containing such heat sensitive erasable inks.

2. Discussion of Background Information

The commercialization of a new type of ball point pens comprising an ink refill containing heat sensitive erasable ink, also called in the patent literature Thermochromic Coloring Color-Memory Composition, represents a potential threat in the field of security documents.

Heat sensitive erasable ink compositions, in particular heat sensitive erasable aqueous ink compositions, are disclosed, for example, in EP 2 138 550, U.S. Pat. Nos. 4,720,301 and 7,494,537, US 2009/0050013 A1, US 2010/0120614 A1, US 2011/0008095 A1, EP 1 820 662, EP 2 072 277, JP 2010-241867 and JP 2010-229333, the entire disclosures of which are incorporated by reference herein.

Ball point pens containing a refill containing heat sensitive erasable aqueous inks are now widely commercially available (e.g. FriXion™ Ball pens from Pilot or uni-ball Fanthom™ pens from Mitsubishi). The writing implement comprising the heat sensitive erasable ink formulation have been disclosed for instance in US 2011/0008095 A1, the entire disclosure of which is incorporated by reference herein.

The specific properties of a heat sensitive erasable ink are disclosed e.g. in U.S. Pat. No. 4,720,301. The heat sensitive erasable ink composition comprises, as the main components, an electron-donating organic dye, a phenolic compound and an ester compound. The electron-donating organic dye acts as base; its protonated form is coloured while its unprotonated form is colourless. The phenolic compound acts as acid. The ester compound acts as a matrix for the acid-base pair. The ester compound is characterized by its melting and cloud points which are comprised in a range between 5° C. and 50° C. The specific properties of the heat sensitive erasable ink are imputed to the large thermal maximum hysteresis between the different coloured states of the ink.

Indicia or texts written with a heat sensitive erasable aqueous ink may become discoloured by thermal treatment of the indicia: the ink forming the indicia is not physically removed from the substrate; however, through a thermal treatment, the written indicia become invisible to the naked eye of an observer. The thermal treatment may be produced by a heat source, e.g. an open flame or a hair-drier; or alternatively the thermal treatment of the indicia may simply consist in a mechanical rubbing of the ink layer, for instance with a conventional eraser or with a piece of synthetic rubber. The commercialized ball point pens comprising heat sensitive erasable ink refills are equipped with a rubber tip useful to render invisible (""to delete"") written indicia or text.

The ink refills of the commercial pens comprising heat reversible thermal discoloration ink (i.e. heat sensitive erasable ink) are removable and refills are commercially available separately. Thus, a forger may insert an ink refill containing a heat sensitive erasable ink composition, for instance a heat sensitive erasable aqueous ink composition, into an ordinary or a luxury pen and urge a person to use this pen to fill in a value document, for instance a bank cheque; the forger could then easily alter the hand-written information.

In view of the foregoing facts such ball point pens containing a heat sensitive erasable ink formulation and the corresponding refills present a threat in the field of security documents. Forgers may use them for the falsification of value documents, for instance of identity documents, bank cheques, vouchers, fiduciary acts, deeds or certificates.

It is known in the art that value documents, such as for instance cheques, are protected against forgery or tampering attempts through the use of special inks for the background printing. In particular, specific inks have been developed to coat with a printed layer the background of the value document or cheques, in particular in the document areas that must be completed with hand-written information: thus the indicia or the text hand-written in these areas cannot be fraudulently altered or deleted. Usually tampering attempts are performed by using solvents or acids to dissolve the ink of hand-written indicia; or alternatively forgers attempt to delete the information with a conventional eraser. By using specific inks to print the documents background, any tampering attempts leave a clearly visible mark on the document. Specific inks used for this purpose are for instance solvent reactive inks, water fugitive inks or mechanically erasable inks. The protection of the security documents relies upon a colour fading, a colour change or disappearance, or a bleeding off when the document is subject to a falsification attempt by any means such as e.g. an eraser, an organic solvent or an aqueous solution. Fugitive inks are known in the art (see e.g. The Printing Ink Manual, Ed by R. H. Leach and R. J. Pierce, $5^{th}$ edition, page 341. EP 0 835 292, the entire disclosure of which is incorporated by reference herein, discloses for instance such a solvent bleeding ink composition used to print value documents.

However, neither solvent reactive inks nor water fugitive inks would prevent indicia written with a heat sensitive erasable ink to be deleted or rendered invisible through a thermal treatment.

Thus there is a need for a new ink composition, in particular among printers manufacturing value documents, for instance identity documents, bank cheques, vouchers, fiduciary acts, deeds or certificates or other value documents. The new ink composition should combine the forgery prevention properties of the known fugitive ink compositions with new properties aimed at preventing forgery by means of heat sensitive erasable inks.

SUMMARY OF THE INVENTION

The present invention provides a solvent-borne or UV-curable fugitive ink composition for application (e.g. coating) onto a substrate which is to be provided with indicia (e.g. a signature). The ink composition comprises at least one halochromic compound (e.g. one, two, three or more halochromic compounds), at least one filler compound, and the ink composition is capable of preventing indicia that have been formed with a (preferably aqueous) heat sensitive erasable ink (i.e. heat reversible thermal discoloration ink) on an area of the substrate to which the fugitive ink composition has been applied and which indicia have thereafter been subjected to a thermal treatment from becoming invisible to an unaided eye. In other words, the fugitive ink composition of the present application forms a heat-un-erasable (or a heat un-sensitive) mark when an indicia is formed with a heat sensitive erasable ink on an area of the substrate carrying the fugitive ink composition and thereafter subjected to a thermal treatment.

In one aspect of the ink composition, the at least one halochromic compound may be or comprise a compound that changes its color when subjected to a pH change at a pH of equal to or lower than 7.0. For example, the at least one halochromic compound may change its color from a colorless or pale colored state at a lower pH to a (more) colored state at a higher pH.

In another aspect of the composition, the composition may comprise from 0.1% to 5% by weight, e.g., from 0.5% to 2% by weight of the at least one halochromic compound, based on the total weight of the composition.

The at least one filler compound (one or more filler compound) is preferably an ionic filler compound and may be selected from the group consisting of carbon fibers, talc, mica (e.g. muscovite), wollastonite, calcinated clay, kaolin, carbonates (e.g. calcium carbonate, sodium aluminum carbonate), silicates (e.g. magnesium silicate, aluminium silicate), sulfates (e.g. magnesium sulfate, barium sulphate), titanates (e.g. potassium titanate), titanium dioxide, montmorillonite, graphite, vermiculite, wood flour, quartz flour, natural fibers, synthetic fibers and combinations thereof. Preferably, the one or more fillers areselected from the group consisting of talc, mica (preferably muscovite), wollastonite, calcinated clay, kaolin, silicates (preferably magnesium silicate and/or aluminium silicate), carbonates(preferably calcium carbonate), montmorillonite and combinations thereof. The one or more fillers are preferably present in an amount from at or about 0.1 to at or about 40 wt-%, more preferably from at or about 1 to at or about 30 wt-%, the weight percentages being based on the total weight of the fugitive ink composition.

In yet another aspect, the ink composition may further comprise at least one organic dye that becomes luminescent (e.g., fluorescent) upon irradiation with UV light. For example, the composition may comprise from 1% to 15% by weight, e.g., from 1% to 10% by weight, or from 1% to 5% by weight of the at least one organic dye, based on the total weight of the ink composition.

In yet another aspect, the ink composition of the present invention may further comprise one or more additives selected from the group consisting of a wax, a solvent, an antioxidant, a drying agent, a dyestuff, an anti-foaming additive, a UV stabilizer, and a photoinitiator.

In a still further aspect, the ink composition of the present invention may be selected from the group consisting of solvent reactive inks, water fugitive inks, mechanically erasable inks, solvent reactive and water fugitive inks, solvent reactive and mechanically erasable inks, water fugitive and mechanically erasable inks, and water fugitive and solvent reactive and mechanically erasable inks.

In yet another aspect, the ink composition of the present invention, upon treatment of heat-treated indicia with an acidic liquid, may be capable of leaving visible marks on the area of the substrate carrying the ink composition.

The present invention also provides a substrate which comprises the fugitive ink composition of the present invention as set forth above (including the various aspects thereof) in at least one surface area thereof. For example, the substrate may be at least one selected from the group consisting of a commercial good, a value document, an identity document, an identity card, a passport, a driver's license, a bank check, a money transfer order, a voucher, a fiduciary act, a deed, and a certificate.

The present invention also provides a method of making a fugitive ink composition of the present invention as set forth above. The method comprises combining a (conventional) fugitive ink composition (e.g., a known fugitive ink composition) with at least one halochromic compound.

The present invention also provides a method of protecting a commercial good or security document from forgery. The method comprises applying the fugitive ink composition of the present invention as set forth above onto at least one area of the good or document that is to be provided with indicia.

In one aspect of the method, the ink composition may be applied by a printing method. For example, the printing method may be selected from the group consisting of offset, flexographic, gravure, inkjet, letterpress and screen printing.

In another aspect of the method, the fugitive ink composition may be selected from the group consisting of evaporation-drying inks, absorption-drying inks, oxidative-drying inks, and radiation-curable inks.

The present invention also provides the use of a fugitive ink composition of the present invention as described above for preventing an indicia formed with a heat sensitive erasable ink on an area of the substrate carrying the fugitive ink composition and thereafter subjected to a thermal treatment from becoming invisible to an unaided eye.

According to a further aspect of said use, said fugitive ink composition is capable of leaving a mark that is visible with an unaided eye on the area of the substrate that carries the ink composition when indicia applied to said area with a heat sensitive erasable ink are first heat treated and subsequently treated with an acidic liquid.

BRIEF DESCRIPTION OF THE DRAWINGS

In the accompanying drawings.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description in combination with the drawings making apparent to those skilled in the art how the several forms of the present invention may be embodied in practice.

The fugitive ink composition of the present invention preferably dries to form a solid matrix remaining sensitive to solvents, water, acids, bleaches or other chemical reagents, and reacts with heat sensitive erasable ink compositions (i.e. heat reversible thermal discoloration ink compositions), in particular with heat sensitive erasable aqueous ink compositions (i.e. heat reversible thermal discoloration aqueous ink compositions). Thus, forgery attempts perpetrated on documents coated with an ink composition of the present invention, including forgery attempts using heat sensitive erasable inks, can easily be detected.

Figure 4A:
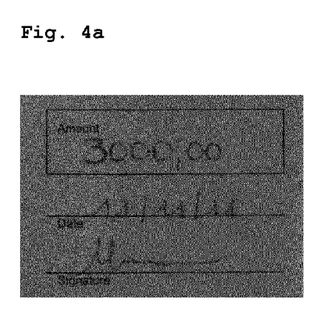
FIGS. 4a and 4b show photographs of samples prepared and treated according to the procedures described in Comparative Example 1 below.
Figure 4B:
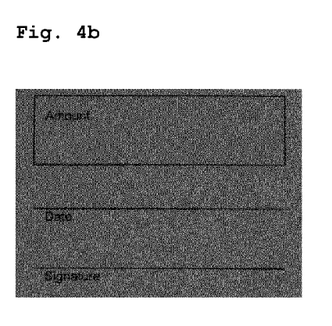

This effect is for instance exemplified in FIGS. 1 and 4 of the present invention. In particular, FIG. 1a shows a picture of a substrate completely printed with a coating layer made of an ink composition according to the present invention; the ink composition is a solvent reactive ink containing a halochromic compound as described in example 1 below. Visible indicia (handwritten text) have been written on the substrate with a pen containing a heat sensitive erasable ink formulation (FriXion™ Ball pen from Pilot). FIG. 1b shows a picture of the same substrate as in FIG. 1a after the hand-written text has been rubbed with the rubber tip of the pen or with a conventional eraser: the text remains visible to an unaided eye.

By contrast, FIGS. 4a and 4b show pictures of a sample prepared with a known fugitive ink. FIG. 4a shows a picture of a substrate completely printed with a coating layer made with a known solvent reactive ink (not part of the present invention) as described in comparative example 1. Visible indicia (handwritten text) have been written on the substrate with a pen containing a heat sensitive erasable ink formulation. FIG. 4b shows a picture of the same substrate as in FIG. 4a, after the handwritten text, which was visible in FIG. 4a, has been rubbed with the pen rubber tip or with a conventional eraser: the text is no longer visible.

Thus, indicia hand-written with heat sensitive erasable ink on document background printed with the ink composition of the present invention remain visible to an unaided eye, even after thermal treatment or forgery attempts by chemical means.

The present invention provides a new ink composition for printing (coating), e.g., a background layer on, for example, a value document. The new ink composition is useful to coat completely or partially (e.g., in one or more areas that are to be provided with indicia) the value document in order to provide a background layer withstanding forgery attempts based on heat sensitive erasable ink. The forgery resistance of the background layer may, for example, be due to a chemical reaction of the ink composition of the present invention with the heat sensitive erasable ink formulation used to hand-write on the value document: in this case even upon thermal treatment or forgery attempts by chemical means the indicia remain visible.

The ink composition of the present invention combines the security features of the known inks used for printing the background layer of value documents such as for instance bank checks with additional functionalities designed specifically to prevent forgery with heat sensitive erasable inks. In particular, the ink composition of the present invention combines the security features provided by fugitive inks as known in the art with additional new security features designed specifically for preventing alteration of heat sensitive erasable inks. Thus the ink composition of the present invention is a fugitive ink that may be used to print the background layer of value documents and is characterized in that it forms permanently visible indicia or marks when printed, marked or put into contact with a heat sensitive erasable ink (i.e. a heat reversible thermal discoloration ink), in particular with a heat sensitive erasable aqueous ink (i.e. a heat reversible thermal discoloration aqueous ink).

The fugitive ink composition of the present invention comprises a (at least one) halochromic compound in addition to the usual components of a conventional fugitive ink composition. The fugitive ink containing the halochromic compound may, for example, be a solvent reactive ink, a water fugitive ink or a mechanically erasable ink.

As used herein, the term "halochromic compound" describes a material which changes optical state, in particular color, upon a change in pH. Thus a change in the acidity or basicity of the ink composition containing the halochromic compound results in a change of the optical absorbance of the halochromic material.

The halochromic component may be (and preferably is) a pH indicator having a transition pH range (color change) at a pH value equal or lower than 7.0. Preferably the halochromic component switches from a colourless or very pale coloured state at lower pH to a coloured state at higher pH.

Non-limiting examples of halochromic compounds which are suitable for use in the present invention include malachite green, brilliant green, eosine yellowish, erythhrosin B, methyl green, methyl violet, picric acid, cresol red, crystal violet, metanil yellow, m-cresol purple, thymol blue, p-xylenol blue, eosin bluish, naphtol yellow 2B, quinaldine red, 2,4-dinitrophenol, bromochlorophenol, bromophenol blue, bromocresol green, bromocresol green sodium salt, 2,5-dinitrophenol, alizarinsulfonic acid sodium salt, phloxine B, methyl red, methyl orange, chrysoidin, cochineal, chlorophenol red, bromocresol purple, bromophenol red, brilliant yellow, rosolic acid, 4-nitrophenol, ocresolphthalein, bromoxylenol blue, alizarin, nitrazine yellow, bromothymol blue sodium salt, bromothymol blue, phenol red, phenol red sodium salt, 3-nitrophenol, phenolphthalein, mordant orange, thiazol yellow G, thymolphthalein, alizarin yellow GG, indigo carmine, and titan yellow, to name just a few.

The ink composition of the present invention may optionally contain further additives such as for instance dyes or pigments. In particular, the ink composition of the present invention may further contain from 1 to 15%, preferably from 1 to 5% (weight %) of one or more organic dyes selected from dyes that are luminescent under UV-light illumination. Non-limiting examples of suitable organic dyes include xanthene (e.g. C.I. acid red 52, C.I. No. 45100), pyrene (e.g. C.I. solvent green 7, C.I. No 59040), methane (e.g. C.I. basic violet 21, C.I. No 48030), stilbene (e.g. direct yellow 106, C.I. No 40300), coumarin (e.g. C.I. No 551100), cyanine (e.g. C.I. No 48016), oxazine (e.g. C.I. No 51180), uranine (e.g. C.I. acid yellow 73, C.I. 45350) and/or C.I. acid yellow 245. Such dyes are known in the art and have been used for instance for colouring oxidised metal surfaces as disclosed in WO 2011/038829, the entire disclosure of which is incorporated by reference herein.

As used herein, the term "permanent visible indicia" denotes indicia that is visible to an unaided human eye and remains visible even after the indicia have been subjected to a physical or a chemical treatment, such as, for instance, exposure to a heat source, mechanical rubbing, or application of a solvent or an aqueous solution.

As used herein, the term "fugitive inks" refers to inks that irreversibly fade, disappear or change colour once water, aqueous solutions, bleaches or organic solvents are applied to surfaces printed with the fugitive inks under common conditions of forgery (i.e. conditions which do not adversely affect the substrate carrying on its surface the printed fugitive inks, e.g. the surface and/or the material of the value document carrying the fugitive inks); alternatively, the term "fugitive inks" refers to inks that irreversibly fade, disappear or change colour once surfaces printed with the fugitive inks are rubbed with, for instance, a conventional eraser. Such fugitive inks are known in the art and are used for instance to print backgrounds of value documents: any alteration of the background aspect represents an undisputable hint of a forgery attempt.

Fugitive inks known in the art may be classified as follows:
i) solvent reactive ink: an ink that irreversibly fades, disappears or changes colour when an organic solvent, e.g. alcohol, petrol, aromatic solvents e.g. toluene, is applied to a surface printed with this solvent-reactive ink under common conditions of forgery (i.e. conditions which do not adversely affect the substrate carrying on its surface the printed fugitive inks, e.g. the surface and/or the material of the value document carrying the fugitive inks);
ii) water-fugitive ink: an ink that irreversibly fades, disappears or changes colour when water, an aqueous solution or a bleaching solution is applied to a surface coated with this water-fugitive ink under common conditions of forgery (i.e. conditions which do not adversely affect the substrate carrying on its surface the printed fugitive inks, e.g. the surface and/or the material of the value document carrying the fugitive inks);
iii) mechanically erasable ink: an ink that irreversibly fades, disappears or changes colour when the surface printed with this mechanically erasable ink is rubbed with a friction body, such as e.g. an eraser.

Thus, according to the present invention fugitive inks preferably comprise an ink selected from the group consisting of a solvent reactive ink, a water fugitive ink or a mechanically erasable ink; alternatively, as used herein, the term "fugitive ink" also comprises an ink combining the properties of at least two inks selected from the group of solvent reactive, water fugitive and mechanically erasable inks, for instance, an ink that is both solvent reactive and mechanically erasable.

As used herein, the term "heat sensitive erasable ink" refers to an ink formulation that reversibly fades or changes colour once subjected to a heat source. The reversible discoloration behaviour of the ink formulation results from the broad maximum hysteresis width of the colour density versus temperature curve. Thus, the ink formulation becomes discoloured upon application of a heat treatment of the printed ink layer; the ink layer maintains the colourless invisible state until the temperature is decreased below a threshold temperature; at this threshold temperature and below it, the ink layer reverts to its coloured visible state.

The heat sensitive erasable ink formulations suitable in the context of the present invention are reversible thermal discoloration compositions comprising
a) an electron-donating chromatic organic compound A (i.e. a Lewis base)
b) an electron-accepting compound (a Lewis acid) or a compound having an acidic proton (a Brönsted acid), as compound B
c) a compound C acting as the reaction medium controlling the reaction of compounds A and B, compound C being characterized by the temperature difference between its melting point and its clouding point, the temperature difference ranging between 5° C. and 50° C.

Typical heat sensitive erasable ink formulations suitable for the present invention have been described in e.g. EP 2 138 550, U.S. Pat. Nos. 4,720,301 and 7,494,537, US 2009/0050013 A1, US 2010/0120614 A1, US 2011/0008095 A1, EP 1 820 662, EP 2 072 277, JP 2010-241867 and JP 2010-229333.

As used herein, the term "heat sensitive erasable ink" does not refer to thermochomic inks based on liquid crystals material or on metallic compounds.

The ink composition of the present invention is a solvent-borne ink composition or a UV-curable ink composition. On the other hand, the ink composition of the present invention may not be a waterborne ink composition. The ink composition of the present invention may be dried by, for example, solvent evaporation, by absorption drying, by oxypolymerization or by radiation energy such as UV-light or e-beam (electronic beam).

According to one embodiment, the ink composition of the present invention is a solvent-borne ink composition. As used herein, the term "solvent-borne ink composition" refers to an ink composition whose liquid medium or carrier substantially consists of one or more organic solvents. The liquid medium of a solvent-borne ink composition in accordance with the present invention comprises at most 5 wt.-% water, preferably at most 1 wt.-% water, and most preferred less than 0.1% water. The solvent-borne ink composition comprises the liquid medium usually in an amount of from 1 to 70% by weight, especially from 1 to 50% by weight, and more especially from 2 to 45% by weight, based on the total weight of the ink.

Examples of such solvents include alcohols (such as e.g. methanol, ethanol, isopropanol, n-propanol, ethoxy propanol, n-butanol, sec-butanol, tert-butanol, iso-butanol, 2-ethylhexyl-alcohol); polyol (such as e.g. glycerol, 1,5-pentanediol or 1,2,6-hexanetriol); esters (such as e.g. ethyl acetate, propyl acetate, n-butyl acetate); carbonates (such as e.g. dimethyl carbonate, diethylcarbonate, di-n-butylcarbonate, 1,2-ethylencarbonate, 1,2-propylenecarbonate or 1,3-propylencarbonate); aromatic solvents (such as e.g. toluene, xylene); ketones (such as e.g. acetone, methyl ethyl ketone, methyl isobutyl ketone, diacetone alcohol, cyclohexanone); amides (such as e.g. dimethylformamide or dimethyl-acetamide); aliphatic or cycloaliphatic hydrocarbons; chlorinated hydrocarbons (such as e.g. dichloromethane); nitrogen-containing heterocyclic compound (such as e.g. N-methyl-2-pyrrolidone or 1,3-dimethyl-2-imidazolidone); ethers (such as e.g. diethyl ether, tetrahydrofuran, dioxane); alkyl ethers of a polyhydric alcohol (such as e.g. 2-methoxyethanol or 1-methoxypropan-2-ol); alkylene glycols, alkylene thioglykols, polyalkylene glycols or polyalkylene thioglykols (such e.g. ethylene glycol, polyethylene glycol (such as e.g. diethylene glycol, triethylene glycol, tetraethylene glycol), propylene glycol, polypropylene glycol (such as e.g. dipropylene glycol, tripropylene glycol), butylene glycol, thiodiglycol, hexylene glycol or mixtures thereof); nitriles (such as e.g. acetonitrile, propionitrile), sulfur-containing compounds (such as e.g. dimethylsulfoxide or sulfolan) and mixtures thereof.

Most preferably the liquid medium comprises a solvent selected from the group comprising aliphatic or cycloaliphatic hydrocarbons, nitrogen-containing heterocyclic compounds, polyalkylene glycol, esters and mixtures thereof.

According to another embodiment, the ink composition of the present invention is a UV-curable ink composition, preferably a radically UV-curable ink, i.e. inks curable through a radical curing mechanism.

As used herein, the term "UV-curable ink composition" refers to an ink composition which may be cured by UV-Visible light radiation (hereafter referred as UV-curable) and/or by E-beam radiation (hereafter referred as EB). When a UV-curable ink composition is used, it is preferred that the ink compositions is cured by UV-visible light radiation. Radiation curable compositions are known in the art and can be found in standard textbooks such as the series "Chemistry & Technology of UV & EB Formulation for Coatings, Inks & Paints", published in 7 volumes in 1997-1998 by John Wiley & Sons in association with SITA Technology Limited. Preferably the UV-curable ink compositions described herein comprise a) a binder compound which comprises oligomers (also referred in the art as prepolymers), preferably selected from the group consisting of radically curable compounds.

Radically curable compounds are cured by free radical mechanisms consisting of the activation by energy of one or more photoinitiators which liberate free radicals which in turn initiate the polymerization of the binder compound(s). Preferably, the binder consists of oligomers selected from the group consisting of oligomeric (meth)acrylates, vinyl and propenyl ethers, and mixtures thereof, and more preferably the binder compound is selected from the group consisting of epoxy (meth)acrylates, (meth)acrylated oils, polyester (meth)acrylates, aliphatic or aromatic urethane (meth)acrylates, silicone (meth)acrylates, amino (meth)acrylates, acrylic (meth)acrylates, and mixtures thereof. A second binder may be added to the UV-Vis-curable optically variable compositions described herein, such a binder may be selected from the group consisting of monomeric acrylates such as for example trimethylolpropane triacrylate (TMPTA), pentaerytritol triacrylate (PTA), tripropyleneglycoldiacrylate (TPGDA), dipropyleneglycoldiacrylate (DPGDA), hexanediol diacrylate (HDDA) and their polyethoxylated equivalents such as for example polyethoxylated trimethylolpropane triacrylate, polyethoxylated pentaerythritol triacrylate, polyethoxylated tripropyleneglycol diacrylate, polyethoxylated dipropyleneglycol diacrylate and polyethoxylated hexanediol diacrylate. UV-Vis curing of a monomer, oligomer or prepolymer may require the presence of one or more photoinitiators and may be effected in a number of ways. As known by those skilled in the art, the one or more photoinitiators are selected according to their absorption spectra and are selected to fit with the emission spectra of the radiation source. Depending of the binder compound(s) comprised in the UV-curable ink compositions described herein, different photoinitiators might be used.

Suitable examples of free radical photoinitiators are known to those skilled in the art and include without limitation acetophenones, benzophenones, alpha-aminoketones, alpha-hydroxyketones, phosphine oxides and phosphine oxide derivatives and benzyldimethyl ketals. Other examples of useful photoinitiators can be found in standard textbooks such as "Chemistry & Technology of UV & EB Formulation for Coatings, Inks & Paints", Volume III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited. It may also be advantageous to include a sensitizer in conjunction with the one or more photoinitiators in order to achieve efficient curing. Typical examples of suitable photosensitizers include without limitation isopropyl-thioxanthone (ITX), 1-chloro-2-propoxythioxanthone (CPTX), 2-chloro-thioxanthone (CTX) and 2,4-diethyl-thioxanthone (DETX) and mixtures thereof. The one or more photoinitiators comprised in the UV-curable ink compositions are preferably present in an amount from about 0.1 to about 20 weight percent, more preferably about 1 to about 15 weight percent, the weight percents being based on the total weight of the UV-curable ink compositions.

Among chemicals used for forgery attempts, it is known in the art that acid is often used to attempt dissolving or discolouring the ink of the written indicia. As the forgery resistance of the new ink composition relies mainly on the presence of the halochromic component, the resistance against acid treatment preferably represents a key characteristic thereof. This resistance is exemplified, for instance, in the examples and figures below.

The ink composition of the present invention may be prepared by adding a (at least one) halochromic compound to a conventional fugitive ink composition. For instance, an ink composition according to the present invention may be prepared by the addition of from 0.1% to 5%, preferably 0.5% to 2% (weight percent) of a halochromic compound to a conventional fugitive ink formulation, e.g., to a solvent reactive ink formulation or to a water fugitive ink formulation.

Examples of typical conventional fugitive ink compositions for offset printing for instance may consist of or comprise the following components, depending on the drying mechanism and on the type of fugitive ink:

oxidative-drying solvent reactive ink composition for offset printing

| Component | weight-% |
| --- | --- |
| Varnish | 40-80 |
| Wax compound | 0-5 |
| Filler | 2-30 |
| Solvent | 1-10 |
| Antioxidant | 0.5-2 |
| Drier | 0.5-2 |
| Dyestuff | 0-20 | oxidative-drying water fugitive ink composition for offset printing:

| Component | weight-% |
| --- | --- |
| Varnish | 40-80 |
| NMP | 5-20 |
| Filler | 2-30 |
| Dyestuff | 0-20 |

UV-curable solvent-fugitive ink for offset printing:

| Component | weight-% |
| --- | --- |
| Prepolymers e.g. polyurethane acrylate and/or polyester acrylate | 20-70 |
| Monomer oligomers e.g. oligomer acrylate | 5-30 |
| UV stabilizer | 0.5-5 |
| Mineral Filler | 1-25 |
| Dyestuff | 0-20 |
| Photoinitiator | 1-15 |

The ink composition of the present invention may be applied on a substrate such as a value document by any printing method. Suitable methods include offset, flexographic, gravure, inkjet, letterpress and screen printing. The ink composition of the present invention may be used to print (coat) the whole surface or only one or more particular areas of the substrate.

EXAMPLES

Example 1

Example 1a

An offset-printing solvent-fugitive ink was prepared by mixing the following components:

| Component | weight-% |
| --- | --- |
| Varnish (alcohol soluble phenolic resin (40%) in propylene glycol) | 60 |
| Filler (CaCO$_3$) | 29 |
| Dyestuff (CI Solvent red 89) | 3 |
| Solvent (Propylene glycol) | 5 |
| Antioxidant (Hydroquinone) | 0.5 |
| Cobalt Drier | 0.5 |
| Halochromic component | 2 |

A paper substrate (Type Drewsen) was printed by offset printing with the ink composition. Indicia (text consisting of the check value, date and signature) were applied with a blue ball point pen FriXion™ from the firm Pilot (Sample picture shown in FIG. 1a).

FIGS. 1a-1d represent pictures of the sample prepared according to the Example 1. This example serves to show the interaction of a solvent reactive ink of the present invention with indicia written with a commercial pen comprising a refill of a heat sensitive erasable ink.

Figure 1A:
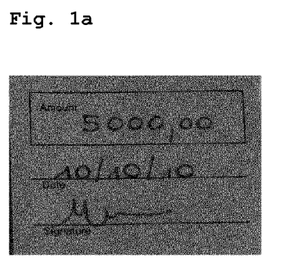
FIGS. 1a-1d show photographs of samples prepared and treated according to the procedures described in Example 1 below.

FIG. 1a shows a picture of the substrate (in this example a check) completely printed with a coating layer made of an ink composition according to example 1. Visible indicia (handwritten text) have been written on the substrate with a pen containing a heat sensitive erasable ink formulation (FriXion™ Ball pen from Pilot).

Example 1b

Figure 1B:
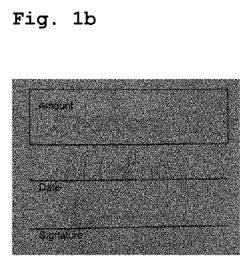

The written text of Example 1a was rubbed with the rubber tip of the pen: even after prolonged rubbing with the rubber tip, the text remained visible to an unaided eye (Sample picture shown in FIG. 1b). Or alternatively, the written text was subjected to the open flame of a cigarette lighter: also in this case, the text remained visible. Similar results were obtained if the written text was subjected to another heat source such as e.g. a hair-dryer.

Example 1c

Figure 1C:
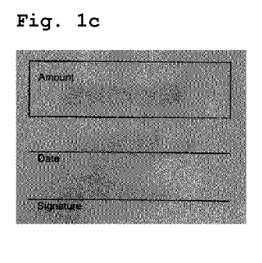

The text of the sample of Example 1b was covered with a 10% aqueous solution of oxalic acid: the aqueous solution was applied with a cotton pad following the text trace. Capillarity absorption resulted in the spreading of the aqueous acidic solution on the paper substrate (Sample picture shown in FIG. 1c): the attempted forgery was evidenced by the mark left by the aqueous acidic solution on the background. FIG. 1c is a picture of the Example 1c. FIG. 1c (Example 1c) illustrates the above described forgery attempt perpetrated on the document of Example 1b carrying the indicia that has been treated with a thermal treatment. In FIG. 1c, the indicia is hardly visible to an unaided eye; however, the acid treatment of the substrate leaves visible traces on the fugitive background ink layer.

Example 1d

Figure 1D:
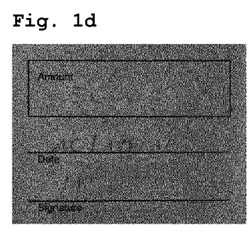

The text of the sample of Example 1b was covered with a 20% aqueous solution of sulphuric acid in the same manner as in Example 1c (Sample shown in FIG. 1d below). FIG. 1d illustrates the result of Example 1d. Example 1d is identical to Example 1c except that a 20% sulphuric acid solution was used instead of the oxalic solution. In this case, the hand-written indicia were clearly visible along with the traces left by the acid solution on the fugitive background ink layer.

Example 2

Example 2a

An offset-printing water-fugitive ink was prepared by mixing the following components:

| Component | weight-% |
| --- | --- |
| Varnish (alcohol soluble maleic resin (50%) and amine solubilizer (9%) in diethylene glycol) | 60 |
| Filler (Aluminium silicate) | 28 |
| Dyestuff (Duasyn Blue 2R Clariant) | 2 |
| Solvent (N-Methyl Pyrrolidone) | 8 |
| Halochromic component | 2 |

Figure 2A:
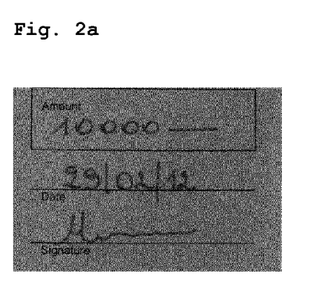
FIGS. 2a and 2b show photographs of samples prepared and treated according to the procedures described in Example 2 below.

A paper substrate was printed with the water fugitive ink composition and treated as described in Example 1a (FIG. 2a).

Figure 2B:
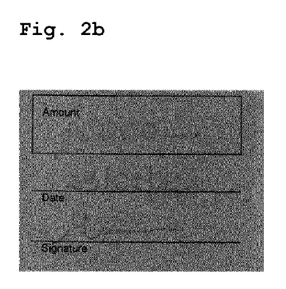

FIGS. 2a-2b represent pictures of the sample prepared according to the Example 2. This example serves to show the interaction of a water fugitive ink of the present invention with indicia written with a commercial pen comprising a refill of heat erasable ink.

FIG. 2a shows a picture of the substrate (in this example a check) printed on its entire surface with a coating layer made with an ink composition according to example 2a. Visible indicia (hand-written text) have been written on the substrate with a pen containing a heat sensitive erasable ink formulation (FriXion™ Ball pen from Pilot).

For Example 2b the sample prepared in Example 2a was treated in the same manner as described in Example 1b. The result is shown in FIG. 2b: the indicia were rubbed with the rubber tip of the pen; the hand-written text remained clearly visible. Thus forgery attempts are easily detectable under daylight (unaided eye).

Example 3

Figure 3A:
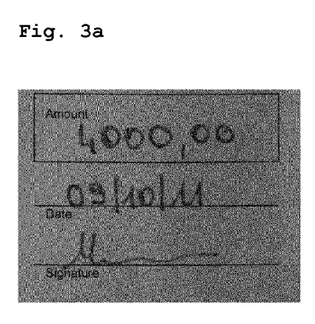
FIGS. 3a-3c show photographs of samples prepared and treated according to the procedures described in Example 3 below.

Example 3a was prepared in the same way as Example 1a except that a black uni-ball Fanthom™ pen from Mitsubishi was used to hand-write the indicia (FIG. 3a).

Figure 3B:
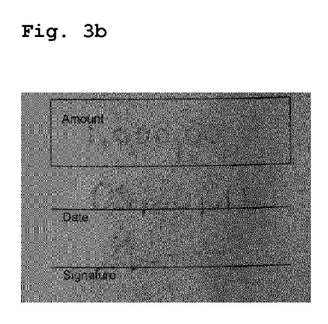
Figure 3C:
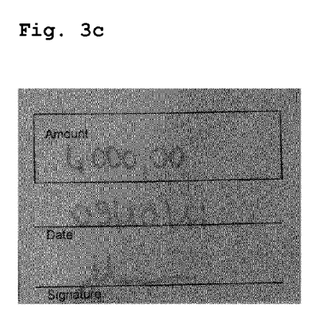

FIGS. 3a-3c represent pictures of the sample prepared according to the Example 3 as a further example of the present invention. Example 3 serves to show that the permanence of the indicia obtained with the ink composition of the present invention is independent of the heat sensitive erasable ink.

FIG. 3a shows a picture of the substrate (in this example a check) printed on its entire surface with a coating layer made with an ink composition according to example 1a.

Visible indicia (hand-written text) have been written on the substrate with a pen containing a heat sensitive erasable ink formulation (uniball Fanthom™ pen from Mitsubishi); the pen and the heat sensitive erasable ink formulation are thus different from those employed in Example 1.

Example 3b (FIG. 3b) and Example 3c (FIG. 3c) were prepared as Example 1b-1c respectively, using the sample prepared in Example 3a. FIG. 3c is a picture of the Example 3c. FIG. 3c (Example 3c) illustrates a forgery attempt perpetrated on the document of Example 3b carrying the indicia that has been treated with a thermal treatment. In Example 3c, the document of FIG. 3b was treated with an aqueous acidic solution (10% oxalic acid) to attempt deleting or altering (by discolouration) the handwritten text: in this case, the indicia remained clearly visible to an unaided eye. When sulphuric acid was used instead of oxalic acid (Example 3b), the indicia remained even more clearly visible. (FIG. 3b).

Comparative Example 1

Not Part of the Present Invention

Comparative Example 1a

An offset-printing solvent reactive ink was prepared by mixing the following components:

| Component | weight-% |
| --- | --- |
| Varnish (alcohol soluble phenolic resin (40%) in propylene glycol) | 61 |
| Filler (CaCO$_3$) | 29 |
| Dyestuff (CI Solvent red 89) | 4 |
| Solvent (Propylene glycol) | 5 |
| Antioxidant (Hydroquinone) | 0.5 |
| Cobalt Drier | 0.5 |

(same solvent reactive ink composition as in Example 1 except that in this case the ink composition does not contain a halochromic compound; the weight % of varnish and dyestuff were accordingly adapted (no influence on the ink fugitive properties).

A paper substrate was printed in a similar way as in Example 1a. A text was written as in Example 1a with a blue ball point pen FriXion™ from the company Pilot (Sample picture shown in FIG. 4a).

Comparative Example 1b (FIG. 4b) was prepared in the same manner as Example 1b, using the sample prepared in Comparative Example 1a.

FIGS. 4a-4b represent pictures of the samples prepared in the Comparative Examples 1a-1b. In Comparative Example 1, a substrate (for instance a check) was coated with the printed coating layer made of a prior art fugitive ink composition according to comparative example 1a (FIG. 4a). In this case, the fugitive ink composition was a prior art solvent reactive ink; it does not contain a halochromic compound.

When the indicia were subjected to a thermal treatment as described in Comparative Example 1b, they became invisible under daylight (unaided eye) (FIG. 4b). Thus the perpetrated forgery became undetectable.

In contrast to Comparative Example 1 (FIG. 4), Example 1 (FIG. 1), Example 2 (FIG. 2) and Example 3 (FIG. 3) clearly demonstrate the effect of the halochromic compound added to the fugitive inks. The indicia remain visible under daylight to an unaided eye only when the fugitive inks comprise the halochromic compound.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A security document comprising:
   a substrate including thereon an area for receiving indicia comprising at least one of value, date and signature;
   the area of the substrate including a printed background comprising a solvent-borne or UV-curable fugitive ink composition including a halochromic compound and a filler; and
   the fugitive ink composition being capable of preventing indicia formed from a heat sensitive erasable ink from becoming invisible to an unaided eye when the indicia is applied to the area and thereafter subjected to thermal treatment.

2. The security document according to claim 1, wherein the security document is an identity card, a passport, a driver's license, a bank check, a money transfer order, a voucher, a fiduciary act, a deed or a certificate.

3. The security document according to claim 1, wherein the filler compound is selected from the group consisting of carbon fibers, talc, mica, wollastonite, calcinated clay, kaolin, carbonates, silicates, sulfates, titanates, titanium dioxide, montmorillonite, graphite, vermiculite, wood flour, quartz flour, natural fibers, synthetic fibers and combinations thereof.

4. The security document according to claim 1, wherein the filler compound is selected from the group consisting of talc, mica, wollastonite, calcinated clay, kaolin, silicates, carbonates, montmorillonite and combinations thereof.

5. The security document according to claim 1, wherein the halochromic compound changes its color when subjected to a pH change at a pH of equal to or lower than 7.0.

6. The security document according to 1, wherein the halochromic compound changes its color from a colourless or pale coloured state at a lower pH to a (more) colored state at a higher pH.

7. The security document according to claim 1, wherein the fugitive ink composition comprises from 0.1% to 5% of the halochromic compound, based on the total weight of the fugitive ink composition.

8. The security document according to claim 1, wherein the fugitive ink composition further comprises an organic dye that becomes luminescent upon irradiation with UV light.

9. The security document according to claim 8, wherein the fugitive ink composition comprises from 1% to 15% of the organic dye, based on the total weight of the fugitive ink composition.

10. The security document according to claim 1, wherein the fugitive ink composition further comprises one or more additives selected from the group consisting of a wax, a solvent, an antioxidant, a drying agent, a dyestuff, an anti-foaming additive, a UV stabilizer, and a photoinitiator.

11. The security document according to claim 1, wherein the fugitive ink composition is selected from the group consisting of solvent reactive inks, water fugitive inks, mechanically erasable inks, solvent reactive and water fugitive inks, solvent reactive and mechanically erasable inks, water fugitive and mechanically erasable inks, and water fugitive and solvent reactive and mechanically erasable inks.

12. The security document according to claim 1, wherein the fugitive ink composition is selected from the group consisting of evaporation-drying inks, absorption-drying inks, oxidative-drying inks, and radiation-curable inks.

13. The security document according to claim 1, wherein the fugitive ink composition is capable of leaving a mark that is visible with an unaided eye on the area of the substrate that carries the ink composition when the indicia applied to the area with a heat sensitive erasable ink are first heat treated and subsequently treated with an acidic liquid.

14. The security document according to claims 1, wherein the security document is an identity card, a passport, a driver's license, a bank check, a money transfer order, a voucher, a fiduciary act, or a deed.

15. The security document according to claim 4, wherein the silicates comprise at least one of magnesium silicate and aluminium silicate.

16. The security document according to claim 1, wherein the fugitive ink composition comprises from 0.5% to 2% by weight of the halochromic compound based on the total weight of the fugitive ink composition.

17. The security document according to claim 8, wherein the fugitive ink composition comprises from 1% to 10% by weight of the organic dye, based on the total weight of the fugitive ink composition.

18. A method of protecting a security document from forgery, comprising providing on an area of the security document a printed background comprising a solvent-borne or UV-curable fugitive ink composition including at a halochromic compound and a filler, the area being an area for receiving indicia comprising at least one of value, date and signature; and the fugitive ink composition is capable of preventing indicia formed from a heat sensitive erasable ink from becoming invisible to an unaided eye when the indicia is applied to the area and thereafter subjected to thermal treatment.

19. The method according to claim 18, wherein the fugitive ink composition is applied by a printing method.

20. The method according to claim 18, wherein the fugitive ink composition is selected from the group consisting of evaporation-drying inks, absorption-drying inks, oxidative-drying inks, and radiation-curable inks.

* * * * *